No. 614,471. Patented Nov. 22, 1898.
W. C. HOMAN.
WICK RAISER.
(Application filed July 5, 1898.)
(No Model.)

WITNESSES:

INVENTOR
William C. Homan.
BY
ATTORNEY

UNITED STATES PATENT OFFICE.

WILLIAM C. HOMAN, OF MERIDEN, CONNECTICUT, ASSIGNOR TO THE E. MILLER & COMPANY, OF CONNECTICUT.

WICK-RAISER.

SPECIFICATION forming part of Letters Patent No. 614,471, dated November 22, 1898.

Application filed July 5, 1898. Serial No. 685,107. (No model.)

*To all whom it may concern:*

Be it known that I, WILLIAM C. HOMAN, a citizen of the United States, residing at Meriden, county of New Haven, State of Connecticut, have invented certain new and useful Improvements in Wick-Raisers, of which the following is a full, clear, and exact description.

My invention relates to improvements in wick-raisers; and my object is to provide a construction which will be cheap and which may be easily and quickly assembled.

Other advantages will appear from an inspection of the drawings, showing the preferred embodiment of my invention; in which—

Figure 1:
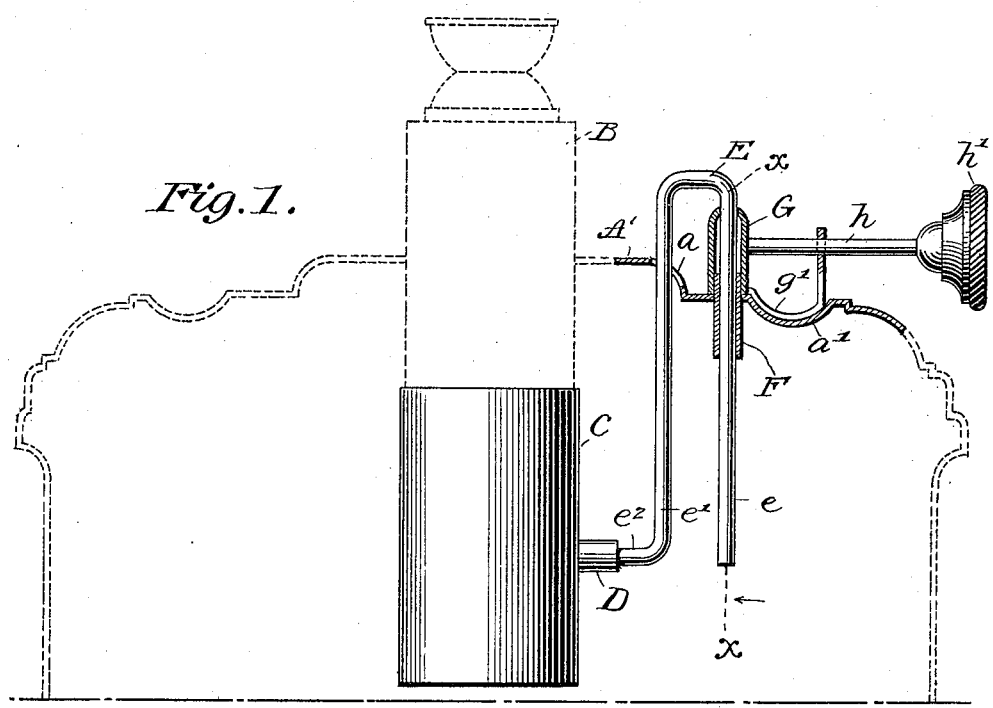
Figure 2:
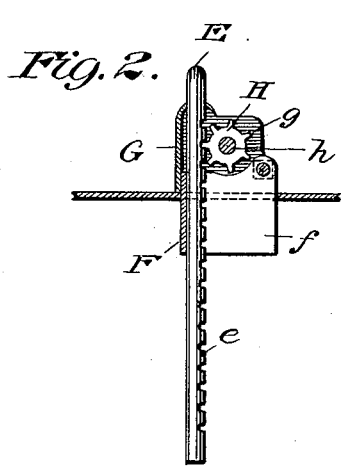
Figure 3:
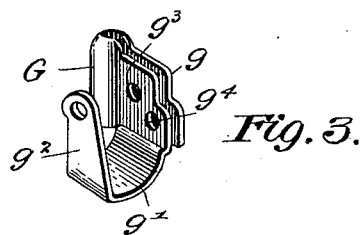
Figure 4:
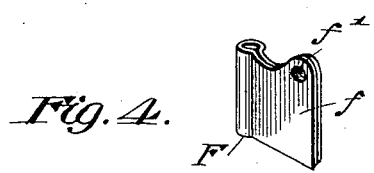

Figure 1 represents a sectional view thereof applied to the casing of a lamp, which is shown in dotted lines. Fig. 2 represents a detailed sectional view on the line X X of Fig. 1. Figs. 3 and 4 represent further details.

In this embodiment of my invention A is a casing of a lamp, preferably the fount thereof. B is the wick-tube, around which is placed the wick, which is gripped by the sleeve C, having the projection D.

E is the wick-raising bar, in this embodiment in the shape of a draw-bar having legs $e\,e'$, of which $e$ is a rack, and $e'$ has a projection at its lower end, which engages the projection D.

F is a guide extending through the casing and preferably fixed therein and preferably having an extension $f$, as shown. G is a casing which preferably fits over this guide and incloses a pinion H. This casing is preferably in the form of an enlargement G, having wings $g$, one of which has a projection $g'$ and a support $g^2$. The lamp-casing has a hole $a$, through which the leg $e'$ passes, and also a depression $a'$, in which rests the projection $g'$.

$g^3$ is a hole in the casing, through which passes the shaft $h$, which carries on one end the pinion H and on the other end the thumb-wheel $h'$.

$g^4$ is a hole extending, preferably, through both of the wings $g\,g$, through which passes a fastening means, preferably a bolt, to hold F and G detachably together.

In this embodiment of my invention the legs of the draw-bar are substantially the same length, so that when the same is pulled out until the lower end of $e$ clears the upper end of F the bend $e^2$ will be at the hole $a$. As the casing G is detachable it may then be slid up on the leg $e$ and the draw-bar removed, the projection $e^3$ passing easily through the hole $a$.

The guide F, with its wings, and the casing G $g$ are preferably each made from a single piece of metal, as shown. The guide F is preferably soldered into a hole in the lamp-casing, and the casing G is then slipped over the same and fastened thereto. It will be seen that in this embodiment the wick-raiser cannot be removed until the casing G is detached from F and slightly raised.

It will be obvious that many variations in the construction shown may be made without departing from the spirit of my invention.

What I claim is—

1. In a device of the character described in combination, a raiser-bar, a guide therefor having an extension, means to raise and lower said bar, and a casing for said means fitting said guide and prevented from rotation by said extension.

2. In a device of the character described in combination, a raiser-bar, a guide therefor, a pinion and shaft to raise and lower said bar, and a casing for said pinion fitting said guide and detachably held in such fitted position, and an extension to support said shaft.

3. In a device of the character described in combination a raiser-bar, a guide therefor having an extension, means to raise and lower said bar, and a casing for said means fitting said guide and extension and prevented from rotation thereby.

Signed at Meriden this 30th day of June, 1898.

WILLIAM C. HOMAN.

Witnesses:
L. W. STADTMILLER,
A. E. MILLER.